Feb. 14, 1967 R. A. KOSTER 3,304,434
POSITION CONTROL SYSTEM EMPLOYING PULSE PRODUCING MEANS
INDICATIVE OF MAGNITUDE AND DIRECTION OF MOVEMENT
Filed June 1, 1965 3 Sheets-Sheet 1

INVENTOR.
ROBERT A. KOSTER
BY
Allen M. Sutton
ATTORNEY

Feb. 14, 1967 R. A. KOSTER 3,304,434
POSITION CONTROL SYSTEM EMPLOYING PULSE PRODUCING MEANS
INDICATIVE OF MAGNITUDE AND DIRECTION OF MOVEMENT
Filed June 1, 1965 3 Sheets-Sheet 2

ROBERT A. KOSTER
INVENTOR.

BY *Allen M. Sutton*

ATTORNEY

United States Patent Office 3,304,434
Patented Feb. 14, 1967

3,304,434
POSITION CONTROL SYSTEM EMPLOYING PULSE PRODUCING MEANS INDICATIVE OF MAGNITUDE AND DIRECTION OF MOVEMENT
Robert A. Koster, Canoga Park, Calif., assignor to The Bunker-Ramo Corporation, Stamford, Conn., a corporation of Delaware
Filed June 1, 1965, Ser. No. 465,243
6 Claims. (Cl. 250—231)

This invention relates to a position control system and more particularly to an improved position control system embodying a pulse generator functioning as a shaft position encoder. The present application is a continuation-in-part of my corresponding U.S. application Serial No. 334,358, filed December 30, 1963, now abandoned.

It is often convenient to convert a mechanical movement first into a number of pulses and then apply the pulses to some device that can perform a translation movement or a rotation in response to the number of pulses received. A string of pulses is a convenient way of transmitting a movement, as it can be effectively stored simply as a number, and the sensitivity against extraneous disturbing influences during transmission is low. A number of pulses indicative of the magnitude of a rotary movement can be stored in a counter enabling a relatively large number of pulses to be stored with a minimum of equipment.

However, pulses indicative of the magnitude of the movement, as such, can only indicate the absolute magnitude of the movement, whereas the sense or direction of the movement, when this is a variable, has to be indicated by some form of sign indicator. For instance, when a rotary member can perform alternate movements in a forward sense and a backward sense and in both cases pulses are generated, some sort of device is usually necessary to distinguish between pulses generated during the forward movement and pulses being generated during the backward movement of the rotary member. Ordinarily the forward pulses may have to be added to some member or quantity whereas the pulses associated with the backward movement may have to be subtracted from that same number or quantity.

A situation of this nature exists in conjunction with a display system employing cathode ray displays that may be generated by a computer or data handling device. Such displays may be graphs depicting a physical phenomenon or the display may be imagery of some different nature. Often it is desirable to manually control the movement of a pointer or dot on an X–Y plane, i.e., the display surface, to enable it to be moved to specific areas of interest or to cause certain points of the display to light up more than others or to perform other simple or more complete actions, essentially manually controlled, to emphasize certain features of a display.

The present invention is useful for generating pulses in response to mechanical movement e.g., rotary, and indicating the direction of the movement so that the operator can direct a point or cursor to any desired point of a display area. According to an important aspect of the invention, pulses are essentially generated in pairs, each pair indicating an incremental movement having a unit magnitude and the pair also indicating the sense of the direction of the movement that is exerted. The electrical signals generated can be used to energize a register, such as, for example, a counter in which the number of counts received is registered. The versatility of such a system becomes apparent when it is realized that such counters or corresponding registers may be receptive to other inputs than the count generating input and may for instance be set by hand operated switches to a predetermined number so that an operator can direct a cursor initially to a predetermined area and make small additional adjustments by applying a number of pulses by manual operation with the pulse generating means.

According to one embodiment of the invention manually operated means such as a ball control are provided for the operator in front of the display system for controlling the position of the marker or cursor referred to previously. The ball is a convenient device allowing the resolution of a manual movement in any direction into a pair of perpendicular components. For this purpose the ball is mounted freely rotatable in a socket and in frictional engagement with mechanical elements such as rollers journaled in shafts directed perpendicular with respect to one another. A detection means is provided for each of the shafts which is capable of both generating a number of pulses in proportion to the shaft rotation, and indicating the direction of rotation. Consequently, it can be determined whether the generated pulses are to be added to or subtracted from a registered total. Coupled to each shaft is a movable medium, e.g., a disc alternately defining first and second types of zones, the latter comprising marks circumferentially disposed on the discs. First and second transducers are disposed alongside each disc. The transducers have the property of defining a first state when disposed opposite a mark and a second state when disposed opposite a first type zone. Accordingly, rotation of a shaft causes a transducer to alternate between first and second states. The angular displacement between the first and second transducer of each shaft is something other than an integer multiple of the interval between marks, the situation being so that when both transducers are, at a given shaft position, in the first state, rotation of the shaft results in the first and second transducer going to the other state in a sequence that depends on the direction of rotation of the shaft. Means are provided, which will hereinafter be discussed in detail, that determine in which sequence the transducers change state so that the direction of rotation of the shaft can be automatically determined.

According to one embodiment of the invention, the markers for the shaft position may simply comprise holes in a disc mounted on or unitary with the shaft, the holes or slots being circumferentially disposed on said disc. The transducers in this case may be electro-optical devices such as photo resistors operating in conjunction with a small light source that senses a beam of light alternately passing through the openings, and being obscured by the zones between openings of the disc in response to rotation of the shaft. As will be described hereinafter in more detail, an arrangement is possible whereby a single light source operates in conjunction with a first and second electro-optical element or transducer associated with a single shaft. However, an arrangement with two light sources is obviously also possible.

Other transducer arrangements can be employed in conjunction with the invention. For instance, the shafts may be provided with discs that are circumferentially provided with spaced iron rods. The rods in response to rotation of the shaft move then through a magnetic field in which there is also placed a magnetic relay. When an iron rod moves in proximity to the relay, the local field strength is increased and the relay, which serves as the transducer in this case, becomes energized. When the shaft is rotated so that the zone, when in rotation, is in proximity the latter is de-energized. Other transducers are considered to fall within the scope of the invention. For instance, a disc having alternating conductive and non-conductive areas whose position may be determined capacitively may be utilized, or even such a disc in conjunction with a conductive brush or collector.

The novel features which are believed to be characteristic of the invention, together with other advantages thereof, will be better understood from the following description taken in conjunction with the accompanying drawings, in which:

FIGURE 1 is a diagrammatic perspective view of the device according to the invention which is a shaft encoder in the form of a device for generating pulses in response to the movement of a member and determining the sense of said movement;

FIGS. 2(a) through 2(d) show waveforms useful in explaining the principles underlying the present invention;

Figure 1:
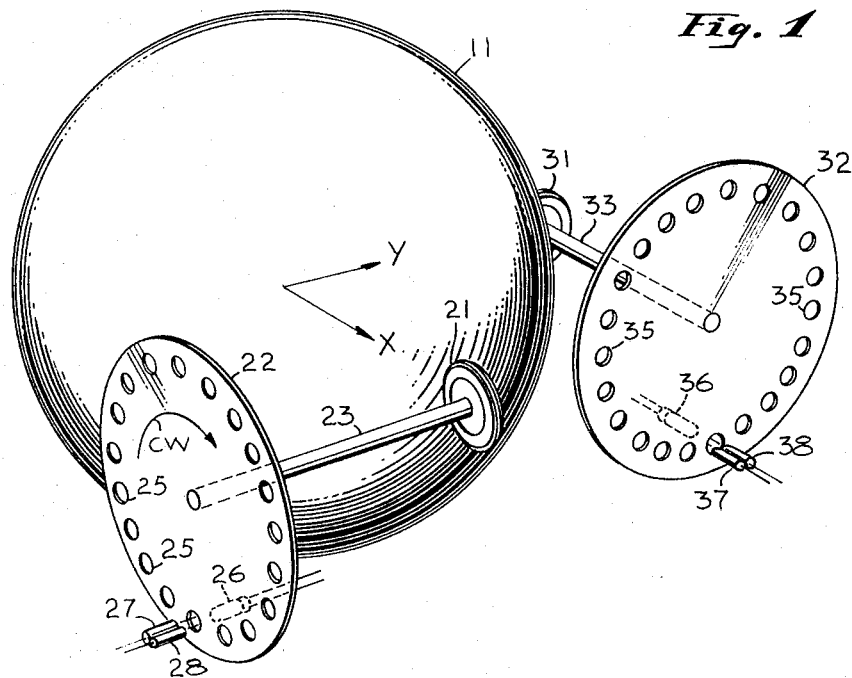

Reference is now made to FIG. 1 wherein a ball control 11, which is conventionally mounted (mounting not shown) and adapted for manual rotation, is shown. The ball control 11 is shown frictionally coupled to a pair of rollers 21 and 31 which, along with a pair of circular discs 22 and 32, are mounted on shafts 23 and 33, respectively. The shafts 23 and 33 are mounted in conventional bearings (not shown) for rotation about their longitudinal axes. As seen from FIG. 1, the axes of rotation of the rollers 21 and 31, which respectively coincide with the axes of the shafts 23 and 33, and the center of the ball control 11 substantially lie in the same plane, generally referred to as the X–Y plane, with the axes of the rollers 21 and 31 forming an angle of 90 degrees. From the arrangement shown in FIG. 1, it will be apparent to one familiar in the art that the rollers 21 and 31 will about their respective axes as the ball control 11 is rotated about axes which are parallel to the axes of rotation of the rollers 21 and 31, respectively. Similarly, the rollers 21 and 31 will rotate, detecting the X and Y components of motion of the ball control 11 as it is rotated about axes which are not parallel to the axis of rotation of either roller 21 or 31.

The discs 22 and 32 have a plurality of holes 25 and 35, respectively, substantially equally spaced near their outer edges with the distances between the holes being approximately equal to the diameters thereof. Light sources 26 and 36 are associated with the discs 22 and 32, respectively, and are so positioned with respect to the discs that, as the discs rotate about their axes, the holes in the discs pass by the light sources so that the light will pass through them. Each of the light sources 26 and 36 has a pair of electro-optical elements, such as photocells, 27 and 28, 37 and 38, respectively, associated therewith and positioned opposite the light sources on the opposite sides of the discs from the light sources. The photocells of each pair are positioned so that the centers of their light-sensitive areas are spaced apart by a distance approximately equal to one-half the diameter of the holes of the discs associated therewith and along a line which is substantially perpendicular to a radius of the disc. This causes the light from the light source 26 which passes through any one of the holes 25 to illuminate the photocells 27 and 28. Similarly, light from the light source 36 passing through any of the holes 35 illuminates photocells 37 and 38. As the ball control 11 is rotated, the discs 22 and 32 rotate so that their respective holes consecutively pass by the light sources 26 and 36, thereby consecutively illuminating the photocells 27 and 28, 37 and 38, respectively.

Figure 2A:
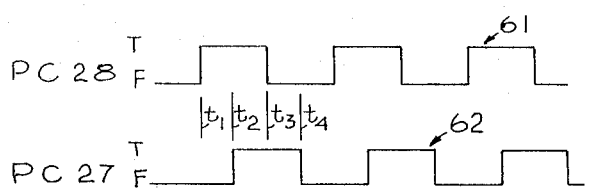

Assume now that the ball control 11 is manually rotated about an axis which is parallel to the axis of the roller 21 so that the disc 22 rotates, and further assume that the disc 22 rotates in a clockwise direction as indicated by an arrow "CW." From FIG. 1, it is apparent that as one of the holes 25 approaches and passes in front of the light source 26, first the photocell 28 will be illuminated, and at some later time both photocells 27 and 28 will become illuminated. As the disc 22 continues to rotate, the particular hole 25 will start to move away from the light source 26 so that no more light will illuminate the photocell 28, and eventually the light from the light source will be completely intercepted by the opaque surface of the disc 22 between adjacent holes, so that neither of the photocells 27 and 28 will be illuminated. As is well known in the art, photocells produce signals which are related to the amount of light which illuminates them. The output signals from the photocells 27 and 28 may best be explained with respect to FIG. 2(a), wherein two idealized waveforms representing those signals are shown. As shown, the signal from the photocell 27 has a first false level, generally indicated by the letter F, which hereafter will correspond to the signal produced by the photocell 27 in the absence of any light illuminating it. Further, the photocell 27 produces an output signal having a true level, generally indicated by the letter T, whenever the photocell is illuminated by light from the light source 26. Similarly, the photocell 28 will produce output signals which have true and false levels, depending on whether the photocell is illuminated by any light from the light source 26, or whether light thereto is cut off. As shown in FIG. 2(a), the photocell 28 is the first to be energized by light from the light source 26 at a time $t_1$, which corresponds to a time when a first hole 25 passes between the light source 26 and the photocells 27 and 28 as the disc 22 is rotated in a clockwise direction (FIG. 1). At time $t_1$, only the photocell 28 is illuminated, the photocell 27 being cut off; the photocell 27 therefore produces an output signal which corresponds to a false level. At time $t_2$, the photocell 28 is still illuminated; however, at that time the photocell 27 will become illuminated since the hole 25 has moved in a clockwise direction so that the light from the source 26 will illuminate both photocells at the same time. Since both photocells 27 and 28 are illuminated at time $t_2$, their output signals both are at true levels. As the disc continues to rotate in a clockwise direction, at time $t_3$ the light towards the photocell 28 will be cut off so that its output signal will become false, while the photocell 27 will continue to be illuminated until time $t_4$ when both photocells will be cut off so that their respective output signal levels will both be false. This sequence of photocell 28 producing an output signal having a true level before the photocell 27 has a similar output signal will be present as long as the disc 22 rotates in a clockwise direction.

Figure 2C:
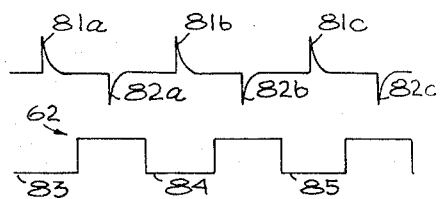
Figure 2B:
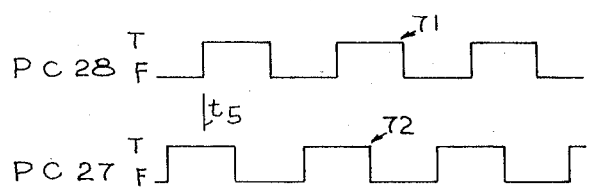

However, whenever the disc 22 is rotated in a counterclockwise direction, photocell 27 will be the first one to be illuminated and therefore produce a true output level signal while the photocell 28 will for a while continue to produce a false output level signal until time $t_5$, as shown in FIG. 2(b), when both photocells 27 and 28 will produce true output level signals. From FIGS. 2(a) and 2(b) it is apparent that it is possible to determine the sense or direction of rotation of the disc 22, depending on which one of the photocells 27 and 28 is the first to become illuminated by the light source 26, thereby being the first to produce an output signal of a true level.

Similarly, the photocells 37 and 38 will produce output signals of true levels whenever light from the light source 36 illuminates them. Of course, the sequence in which one of the two photocells 37 and 38 produces an output signal of a true level before the other photocell does depend on the direction of rotation of the disc 32.

From the foregoing description, it is clear that as the ball control 11 is rotated, the discs 22 and 32 will rotate as a function of the X and Y components of motion of the ball control 11 with the number of pairs of signals produced by each of the pairs of photocells 27 and 28, 37 and 38 indicating the degree of rotation of the ball control 11 and the sequences in which the output signals from each pair of photocells are produced being an indication of the sense or direction of rotation of the ball control 11.

Figure 3:
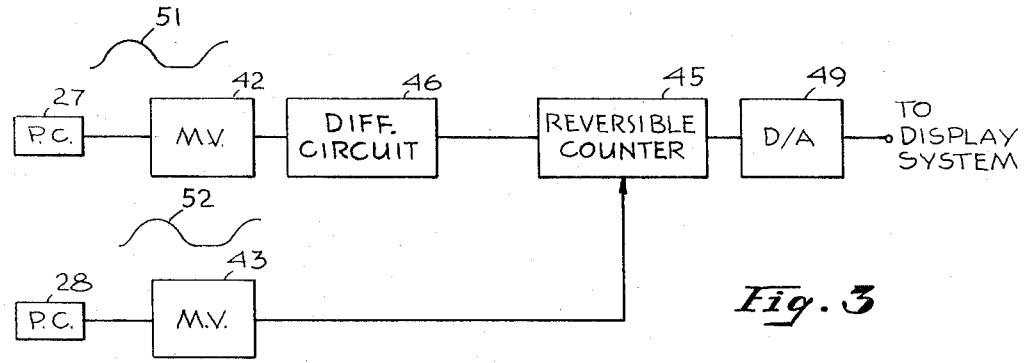
FIG. 3 is a block diagram of one embodiment of the invention.

It is apparent to one familiar in the art that the number of pairs of signals produced by each pair of photocells and the two sequences in which such pairs of signals are produced may be utilized through the use of known techniques to produce other signals which are indicative of the degree and direction of the components of rotation of the ball control 11 about the X and Y axes. Such signals, for example, may in turn be used to control the position of a marker on an electronic display surface or to control other devices, as previously discussed. Reference is now made to FIG. 3, which shows a block diagram of a circuit useful in converting the signals from a pair of photocells, such as photocells 27 and 28, into digital signals. However, it should be understood that the signals from the photocells may be converted and used with other presently known techniques. Therefore, the circuit of FIG. 3 is shown for explanatory purposes only, and it is not to be regarded as limiting the teachings of the invention in any manner whatsoever. As shown, the photocells 27 and 28 are respectively connected to multivibrators 42 and 43 which operate in a manner similar to the well known Schmitt trigger circuit. The multivibrator 42 is connected to a reversible counter 45 through a differentiating circuit 46, while the multivibrator 43 is directly coupled to the reversible counter 45.

As previously explained, the output signals of the photocells 27 and 28 have true or false levels depending on whether or not the photocells are illuminated. Such signals have been explained in connection with FIGS. 2(a) and 2(b), wherein the output signals of the photocells are represented by substantially square waveforms. However, in practice, the output signals of the photocells do not have rise and fall times which are as short as those shown in FIGS. 2(a) and 2(b), but are rather gradual as indicated by waveforms 51 and 52 in FIG. 3. Although such signals could be used to trigger the reversible counter 45, as will be explained hereafter, it has been found that the accuracy of performance is increased by passing the output signals of the photocells 27 and 28 respectively through the multivibrators 42 and 43, whose output signals have substantially square waveforms similar to the waveforms 61 and 62 shown in FIG. 2(a) or the wave forms 71 and 72 shown in FIG. 2(b). The square wave output signal from the multivibrator 42 is supplied to the differentiating circuit 46, wherein the signal is differentiated so that positive pulses, such as pulses 81a, 81b, 81c, of FIG. 2(c), and negative pulses 82a, 82b, and 82c are produced. The positive and negative pulses are supplied to the reversible counter 45 which is adapted to count only the positive pulses. The reversible counter 45 is also energized by the output signal from the multivibrator 43, with the level of that output signal controlling whether the reversible counter 45 adds or subtracts the pulses 81a, 81b, etc. from the count therein. For example, the reversible counter 45 may add positive pulses only if the output signal from the multivibrator 43 is false, then from FIG. 2(c) it is seen that since the positive pulse 81a energizes the reversible counter at time $t_1$ when the output signal 62 is in a false level, as indicated by line 83, the pulse 81a will increase the count in the reversible counter 45. Similarly, pulses 81b and 81c will increase the count in the counter since they occur at times when the output signal from the multivibrator 43 is false, as indicated by lines 84 and 85. Obviously the opposite arrangement could also be possible, depending on which one direction of shaft rotation one wishes to define as the positive direction, and for which the count in the register is to be incremented.

Figure 2D:
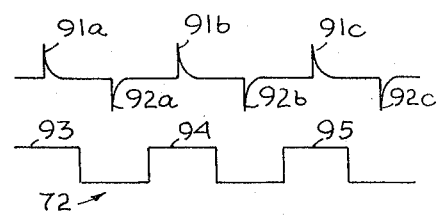

Reference is now made to FIG. 2(d) which shows positive pulses 91a, 91b, 91c produced by differentiating the output signal 71 of the multivibrator 42. It is apparent from FIG. 2(d) and in light of the foregoing explanation that the reversible counter 45 will subtract the positive pulses 91a, 91b and 91c from the count therein, since the pulses 91a, 91b and 91c energize the counter at times when the output signal 72 (FIGS. 2(b) and (d)) of the multivibrator 43 is true, as indicated by lines 93, 94 and 95 in FIG. 2(d).

From the foregoing description, it is seen that the count in the reversible counter 45 indicates the number of pairs of signals produced by each pair of photomultipliers, which is related to the degree of rotation of the disc associated with the pair of photomultipliers. Whether pulses are added or substracted in the counter is determined by the direction of rotation of the disc. The output signal from the reversible counter 45, which is in digital form, may be supplied to a digital-to-analog converter, that generates a voltage in proportion to the count stored in the counter. The voltage thus produced may be applied to a display system so as to deflect a marker therein along one axis, or such output signal may first be passed through a digital-to-analog converter 49, whose output is in analog form for use by a system which is responsive to analog signals only. Although a single pair of photocells and a single counter are shown in FIG. 3, it is apparent that two such circuitry arrangements are necessary to produce signals which indicate the X and Y components of the rotation and the direction of rotation of the ball control 11 (FIG. 1). The output signals in digital or analog form from two counters, such as the reversible counter 45, may then be supplied directly to a system such as a display system so that a marker therein may be deflected along X and Y axes as a function of the signals from the two counters.

Figure 4:
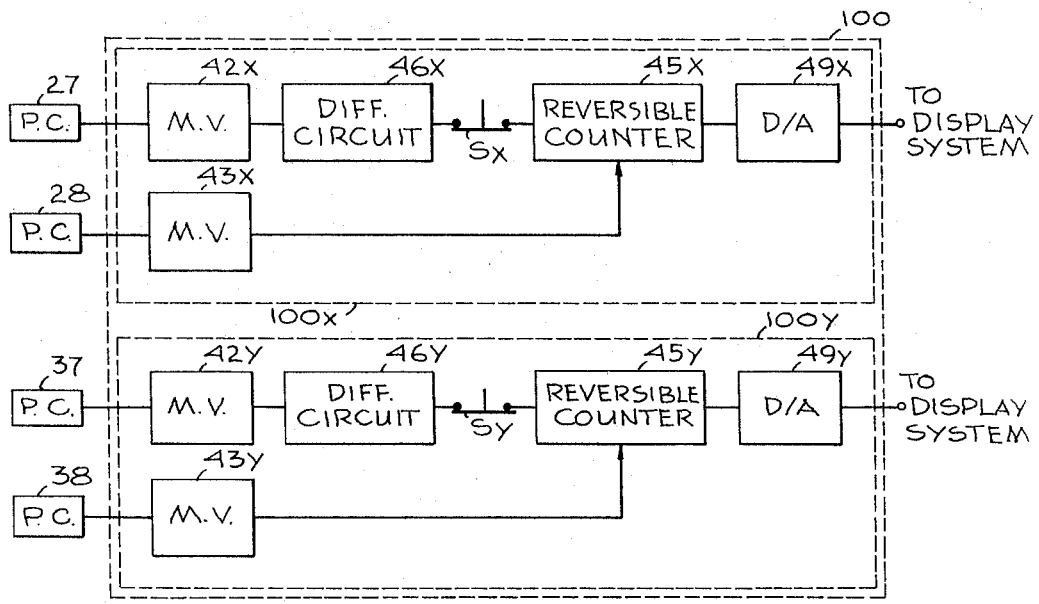
FIG. 4 is a block diagram of another embodiment of the present invention.

Reference is now made to FIG. 4 wherein circuitry arrangements 100X and 100Y incorporated in another embodiment of the present invention are shown. The circuitry arrangements 100X and 100Y, which are coupled to the pairs of photocells 27 and 28, 37 and 38, respectively, perform similarly to the circuit shown in FIG. 3 and therefore will not be explained in detail. As seen in FIG. 4, a normally closed switch $S_x$ connects a differentiating circuit $46_x$ to a reversible counter $45_x$. Similarly, a normally closed switch $S_y$ is connected between a differentiating circuit $46_y$ and reversible counter $45_y$. In light of the previous description, it is apparent that by opening the switch $S_x$, for example, the digital content of the reversible counter $45_x$ is not changed and, therefore, the output signal to the display system is not changed, even though pulses such as pulses 81a, 81b and 81c of FIG. 2(c) are produced by the differentiating circuit $46_x$ as a result of the disc 22 (FIG. 1) rotating in a clockwise direction. The switch $S_x$ therefore may be thought of as an inhibiting switch which deactuates the X portion of the display system to thus prevent it from being affected by the component of rotation of the ball control 11 about the X axis. Similarly, the switch $S_y$ may be thought of as inhibiting or deactuating the display system from being affected by the ball control 11 rotating about the Y axis.

The switches $S_x$ and $S_y$ are adapted for either manual or electronic control so that by opening either switch $S_x$ or $S_y$ the marker of the display system will be deflected only along one axis, even though the ball control 11 is rotated about any axis in the X–Y plane.

Figure 6:
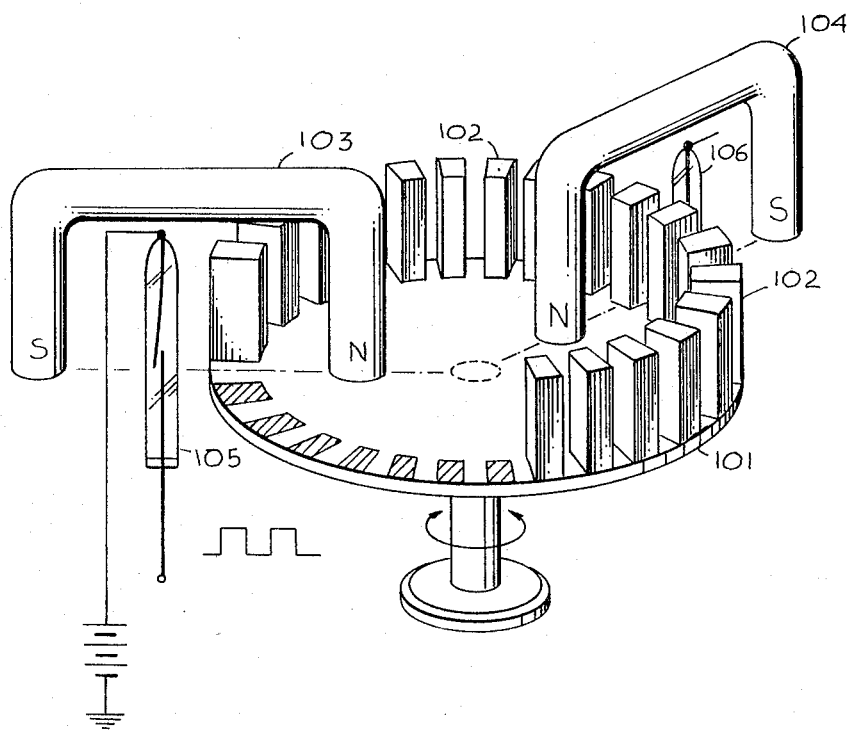
FIG. 6 is a diagrammatic perspective view of a different embodiment of the invention.

FIG. 6 is a diagrammatic perspective view of a different embodiment of the invention. The disc 101 which is rotatably supported on bearings (not shown) carries a plurality of spaced, circumferentially disposed, teeth 102 made from a magnetizable material such as soft iron.

First and second permanent magnets 102 and 104 are spaced so that the lines of force of each of these magnets pass through the circumference of the wheel 101. In each of the fields of the magnets there is also disposed a suitable magnetic transducer, such as, in the present example, reed switches 105 and 106. When one of the iron teeth 102 is disposed between the poles of the permanent magnet 103 the local intensity of the magnetic field is increased and the contact provided on the reed switch 105 will be closed. When, to the contrary, an interstice between the teeth 102 is disposed between the holes of the magnet 103, the local intensity of the field, in the vicinity of the reed switch 105, is decreased so that the contacts are open. The magnet 104 operates, in conjunction with the reed switch 106 in the same fashion as the magnet 103 operates in conjunction with the reed switch 105. However, the magnet 104 is disposed at an angle with respect to the reed switch 103 that is different from an integer multiple of the angular interval between subsequent teeth. Accordingly, the reed switches 105 and 106 are operated at different times, that is, in a sequence which depends on the direction of rotation of the disc 101. The determination of the direction of rotation from the sequence of closing or opening the reed switches 105 and 106 is, of course, analogous to that shown in conjunction with the embodiment of FIG. 3. However, reed switches will, in general, not require the pulses to be shaped as the output waveform of the reed switch allows them to be immediately applied as input to a variety of devices.

From the foregoing, it will be readily obvious that other types of magnetic transducers might be substituted for the reed switches shown in the embodiment of FIG. 6. It will also be readily apparent that other effects than magnetic phenomena may be utilized in the invention. Many position transducers in fact may be utilized that produce some sort of effect in response to the rotation of a rotatable member. For instance, it would be possible to utilize a capacitor as a transducer which operates in conjunction with a rotatable wheel having alternate conductive and non-conductive brushes. These, with the location of the two conductive and non-conductive brushes might then be sensed by an alternating current which depends on the position of the rotatable member, which would have or or not have a current conductive path to ground.

Even more simply, it would be possible to provide a rotatable member having conductive and non-conductive sectors that operate in conjunction with brush contacts to which direct current is supplied. If the brush is in contact with the conducting sector, a voltage drop in the circuit might be indicated to some type of transducer which in this case might simply be a resistor.

In all these cases however, according to the essential concept of the invention there would be provided two transducers which in response to mechanical movement of a member would be operated in a given sequence which sequence would indicate the direction of movement of the member, which arrangement would make it possible to indicate whether the pulses to be generated by the member are to be added to an output or to be subtracted therefrom.

Figure 5:
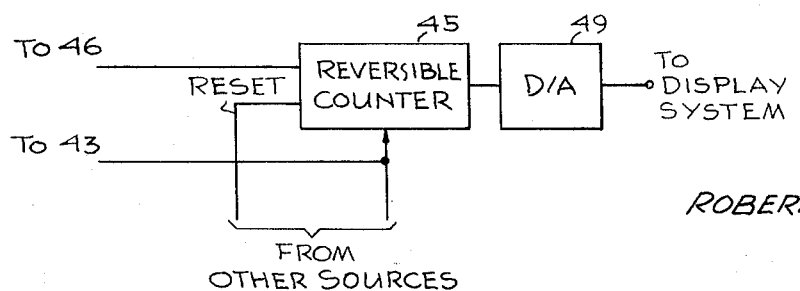
FIG. 5 is a block diagram of another modification.

In any of the embodiments of the present invention either or both of the reversible counters may also be coupled to additional signal sources as shown in FIG. 5. These signal sources may be adapted to produce pulses, to reset the counter, as well as to add pulses to the counter to change its count to a desired value. Thus, the digital content of either or both reversible counters can be altered and their respective output signals may be changed without the need to rotate the ball control.

Summarizing briefly, the present invention discloses a novel system whereby pairs of signals may be produced by a pair of transducers that respond to suitably spaced marks circumferentially disposed on rotatable discs, the number of the pairs of signals produced by the transducers and the time relationship or sequence of the signals of each pair being directly related to the degree and direction of rotation of the disc or any rotating shaft to which it may be coupled. As heretofore described, the pairs of signals and the sequence in which they are produced may be utilized in digital and analog circuitry so as to produce output signals which are a function of the degree and direction of rotation of the disc.

Although in FIG. 1 the photocells of each pair are shown as receiving light through the same hole in the rotatable disc, it is apparent that the same functional result will be obtained if one photocell is moved in an even number of holes along the disc circumference from the position shown.

In one embodiment of the invention, two such discs are mounted on two shafts which are in turn coupled to a ball control so as to detect its components of motion about two perpendicular axes. The two discs have photocells and circuitry associated therewith so that the system produces output signals which are a function of the components of motion of the ball control. Although such output signals have been described as supplied to a display system, wherein a marker is deflected as a function of the output signals, it is apparent that such output signals may be utilized in other systems for control or monitoring purposes.

In other embodiments, the system has been described as incorporating an inhibiting switch and/or signal sources which may be used to control the digital count in counters so that the output signals thereof may be varied without the need of actually rotating the ball control. Such techniques greatly increase the flexibility of the system by producing output signals in response to manual positioning means, such as the ball control, and by incorporating signals from other sources so that the output signals supplied to a display system, or any other system which responds to such signals, may be varied with a maximum degree of flexibility.

Although little has been said herein concerning details of a system in which embodiments of the invention can be employed, it should be appreciated that the invention is useful wherever it is desired to controllably move an element in an X–Y plane. Thus, e.g., the invention is useful for controlling the position of a cathode ray tube beam.

It is apparent that the invention has many other applications, and it is therefore intended not to be limited by the specific embodiments shown or described. Various changes and modifications may be made by one skilled in the art without departing from the true spirit and scope of the invention.

The embodiments of the invention in which an exclusive property or privilege is claimed are defined as follows:

1. Apparatus for controlling the position of an element capable of moving in an X–Y plane having an X axis and a Y axis, said apparatus including:

a manually actuatable control device supported for rotational movement about at least first and second orthogonally related axes;

first means normally actuated to respond to the component of rotational movement of said control device about said first axis for moving said element in a related manner with respect to said X axis; and second means normally actuated to respond to the component of rotational movement of said control device about said second axis for moving said element in a related manner with respect to said Y axis;

said first means including a first medium carrying a plurality of spaced markers thereon;

said second means including a second medium carrying a plurality of spaced markers thereon;

first and second transducer means respectively positioned proximate to said first and second mediums for counting the number and direction of markers moving therepast;

means responsive to said component of rotational movement about said first axis for introducing related movement between said first medium and said first transducer means; and means responsive to said component of rotational movement about said second axis for introducing related movement between said second medium and said second transducer means.

2. The apparatus of claim 1 including means for selectively deactuating either said first or second first mentioned means.

3. The apparatus of claim 1 including first and second bidirectional digital counters;

means responsive to each of said first medium markers moving past said first transducer means in first and second directions for respectively incrementing and decrementing said first digital counter;

means responsive to each of said second medium markers moving past said second transducer means in first and second directions for respectively incrementing and decrementing said second digital counter; and digital to analog conversion means responsive to the counts stored in said first and second digital counters for positioning said element in said X–Y plane.

4. The apparatus of claim 3 including means for selectively inhibiting both incrementing and decrementing of said first digital counter.

5. The apparatus of claim 1 wherein said control device comprises a ball supported for free rotational movement.

6. The apparatus of claim 1 wherein each of said first and second transducer means includes first and second marker sensor devices, each sensor device being responsive to a marker moving therepast for providing an output signal;

means supporting said first transducer means adjacent to said first medium for causing a marker thereon to be sensed by the first marker sensor device thereof prior to it being sensed by the second marker sensor device thereof when the first medium moves past said first transducer means in a first direction and for causing said marker to be sensed by the second marker sensor device thereof prior to it being sensed by the first marker sensor device thereof when the first medium moves past said first transducer means in a second direction;

means supporting said second transducer means adjacent to said second medium for causing a marker thereon to be sensed by the first marker sensor device thereof prior to it being sensed by the second marker sensor device thereof when the second medium moves past said second transducer means in a first direction and for causing said marker to be sensed by the second marker sensor device thereof prior to it being sensed by the first marker sensor device thereof when the second medium moves past said second transducer means in a second direction;

first and second bidirectional counters;

means responsive to the time relationship between the output signals provided by the sensor devices of said first transducer means for determining the direction of counting of said first bidirectional counter; and means responsive to the time relationship between the output signals provided by the sensor devices of said second transducer means for determining the direction of counting of said second bidirectional counter.

References Cited by the Examiner
UNITED STATES PATENTS

| | | | |
|---|---|---|---|
| 2,149,440 | 3/1939 | Jackson | 33—141.5 |
| 2,685,082 | 7/1954 | Beman et al. | 340—271 |
| 2,944,157 | 7/1960 | McAuslan et al. | 250—233 |
| 2,966,591 | 12/1960 | McArtney | 250—203 |
| 3,087,986 | 4/1963 | De Brosse | 250—203 X |

RALPH G. NILSON, *Primary Examiner.*

W. STOLWEIN, *Examiner.*